(12) United States Patent
Lenhart

(10) Patent No.: US 8,297,870 B2
(45) Date of Patent: Oct. 30, 2012

(54) ADJUSTABLE LENGTH POLE OR STICK

(75) Inventor: Klaus Lenhart, Ohmden (DE)

(73) Assignee: Leki Lenhart GmbH, Kirchheim/Teck (DE)

( * ) Notice: Subject to any disclaimer, the term of this patent is extended or adjusted under 35 U.S.C. 154(b) by 492 days.

(21) Appl. No.: 12/541,022

(22) Filed: Aug. 13, 2009

(65) Prior Publication Data

US 2010/0040406 A1 Feb. 18, 2010

Related U.S. Application Data

(63) Continuation-in-part of application No. 10/511,294, filed as application No. PCT/EP03/03805 on Apr. 11, 2003, now Pat. No. 7,726,898.

(30) Foreign Application Priority Data

May 8, 2002 (DE) .............................. 202 07 554 U

(51) Int. Cl.
*A45B 9/00* (2006.01)

(52) U.S. Cl. .................. 403/109.5; 403/370; 403/374.4; 403/377; 135/75

(58) Field of Classification Search ............... 403/109.1, 403/109.5, 368, 369, 370, 371, 374.2, 374.3, 403/374.4, 377; 135/75
See application file for complete search history.

(56) References Cited

U.S. PATENT DOCUMENTS 2,508,039 A 5/1950 Neuwirth
2,533,733 A 12/1950 Jensen
(Continued)

FOREIGN PATENT DOCUMENTS

CH 267177 3/1950
(Continued)

OTHER PUBLICATIONS

English Translation of Patent DE 8,004,343U1.
(Continued)

*Primary Examiner* — Michael P Ferguson
(74) *Attorney, Agent, or Firm* — Sughrue Mion, PLLC

(57) ABSTRACT

An adjustable-length pole (10) for sticks, having an outer tube (12) and an inner tube (11) that can be inserted telescope-like into the outer tube (12) for adjusting the length of the tube, and having a spreading device (15) that is supported at the insertion end of the inner tube (11), the spreading device being able to clamp the inner tube (11) axially in the outer tube (12) and having a spreading element (16) that can be radially pressed apart and that is furnished with an inner cone (27), an interior element (17) that is provided with a reverse-oriented outer cone (22) and that is accommodated in the spreading element (16) so as to be axially movable, and an adjusting screw (18) that is axially oriented and is supported in a rotationally fixed manner on the inner tube (11), the adjusting screw having an operational connection to an internally threaded bore (21) in the interior element (17). So that an adjustable-length tube of this type responds to impact-like axial stresses by continuing to clamp rather than sliding or giving way, provision is made that the inner cone (27) of the spreading element (16) is situated such that it opens in the direction of the inner tube (11), and the spreading element (16) is supported between an inner limit stop (28) on the inner tube (11) and an exterior limit stop (26) on the free end of the adjusting screw (18) so as to be axially movable within narrow limits.

15 Claims, 8 Drawing Sheets

U.S. PATENT DOCUMENTS

| | | |
|---|---|---|
| 2,542,967 A | 2/1951 | Waechter |
| 2,695,800 A | 11/1954 | Soucy |
| 2,947,556 A | 8/1960 | Wenger |
| 3,145,669 A | 8/1964 | Kupski |
| 3,227,113 A | 1/1966 | Kupski |
| 4,134,703 A | 1/1979 | Hinners |
| 4,238,164 A | 12/1980 | Mazzolla |
| 4,856,929 A | 8/1989 | Smahlik et al. |
| 4,858,926 A | 8/1989 | Cabianca |
| 5,458,427 A | 10/1995 | Simond |
| 5,538,354 A | 7/1996 | Simond |
| 5,803,643 A | 9/1998 | Patelli et al. |
| 5,897,268 A | 4/1999 | Deville |
| 6,027,087 A | 2/2000 | Peterson et al. |
| 6,250,839 B1 | 6/2001 | Lenhart |
| 6,719,331 B1 | 4/2004 | Chen |

FOREIGN PATENT DOCUMENTS

| | | |
|---|---|---|
| DE | 1046998 | 12/1958 |
| DE | 10 58 889 | 6/1959 |
| DE | 7701409 | * 1/1977 |
| DE | 79 23 826 | 11/1979 |
| DE | 80 04 343 | 6/1980 |
| DE | 42 10 488 | 10/1993 |
| DE | 43 18 482 | 12/1993 |
| DE | 94 19 707 | 1/1995 |
| DE | 297 06 829 | 9/1998 |
| DE | 297 08 829 | 10/1998 |
| DE | 20301239 U1 | 5/2003 |
| FR | 1 197 234 | 11/1959 |
| FR | 2816515 | 5/2002 |
| GB | 320682 | 10/1929 |
| JP | 1028750 A | 2/1998 |

OTHER PUBLICATIONS

English Translation of Lenhart, DE 29,706,849U1.

English Translation of Neuheiten, CH 267,177.

* cited by examiner

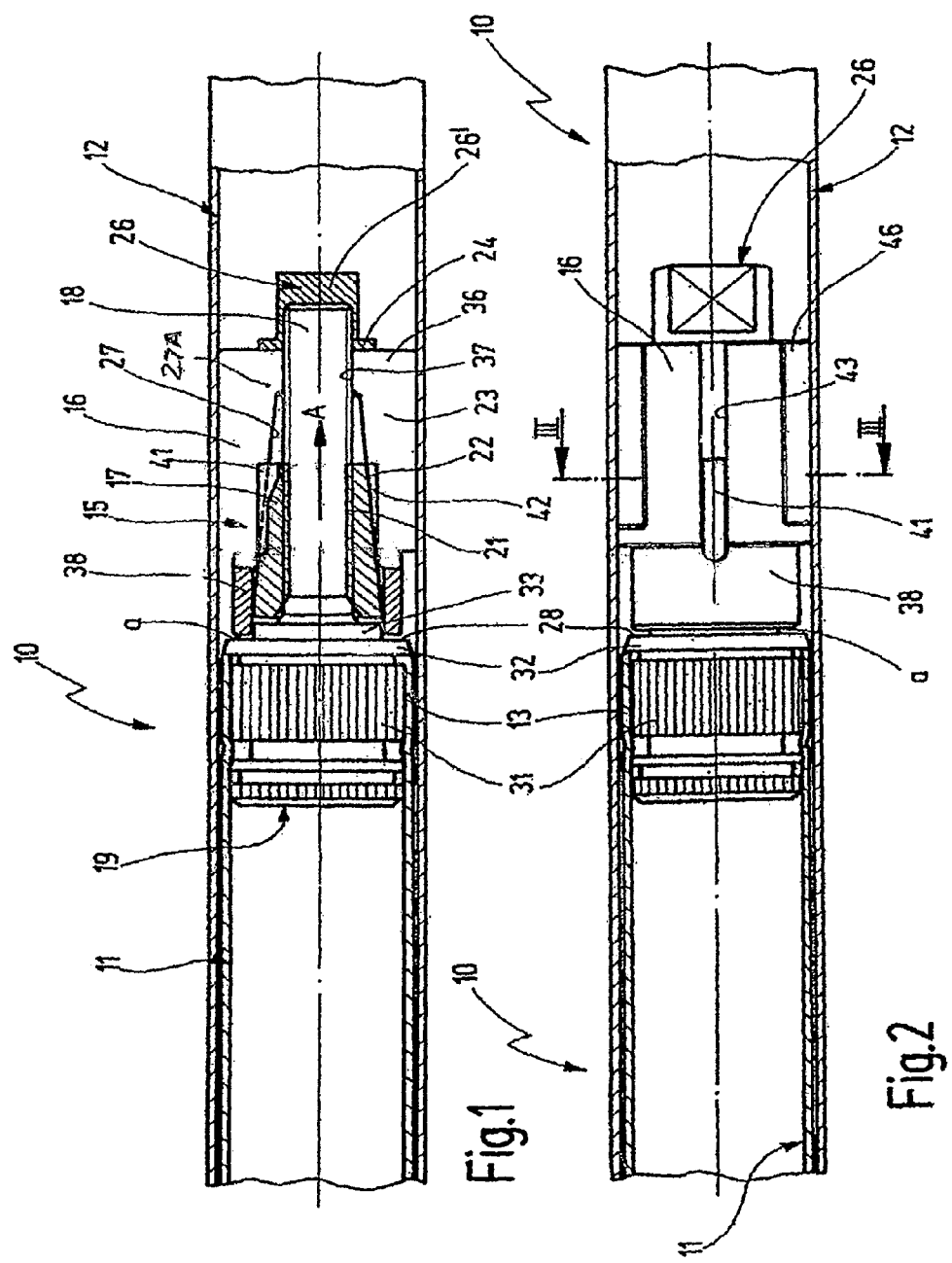

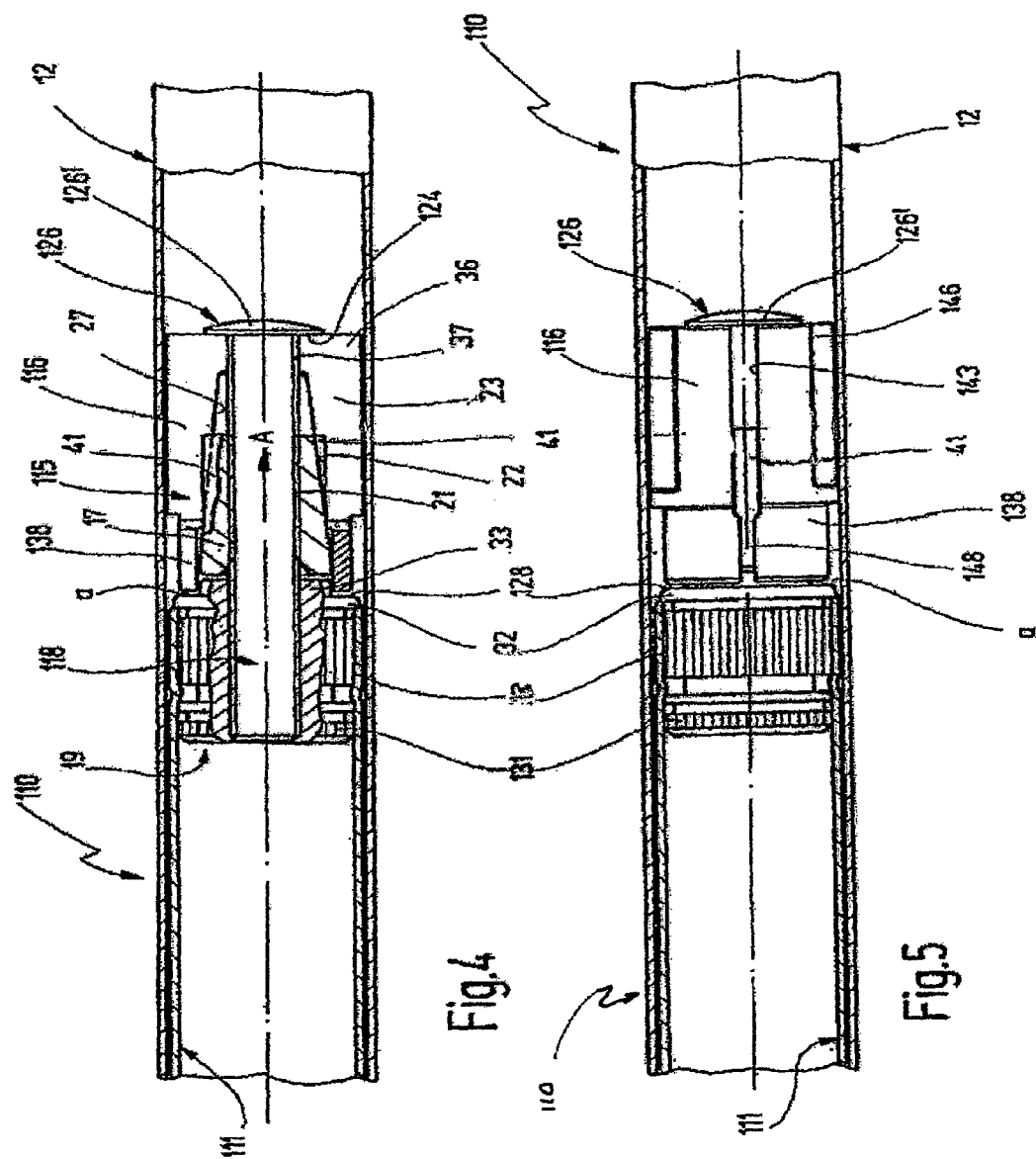

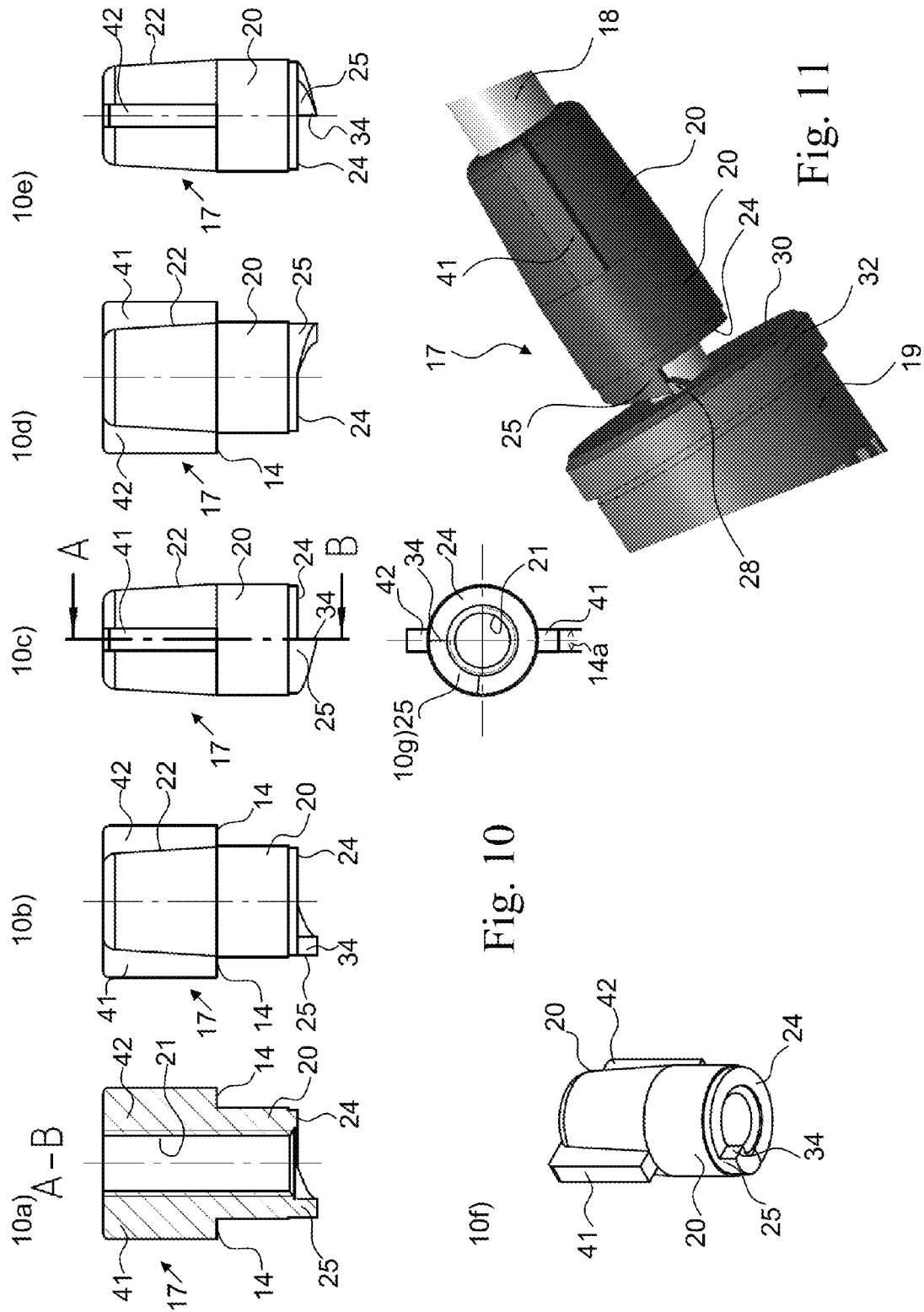

ADJUSTABLE LENGTH POLE OR STICK

CROSS-REFERENCE TO RELATED APPLICATIONS

This is a Continuation-in-Part of application Ser. No. 10/511,294 filed Oct. 15, 2004, now U.S. Pat. No. 7,726,898. The entire disclosure of the prior application, application Ser. No. 10/511,294 is considered part of the disclosure of the accompanying continuation-in-part application and is hereby incorporated by reference.

Application Ser. No. 10/511,294 is the national stage of PCT/EP03/03805 filed on Apr. 11, 2003 and also claims Paris Convention priority of DE 202 07 54.0 filed on May 8, 2002.

BACKGROUND OF THE INVENTION

The present invention relates to an adjustable-length stick or adjustable-length pole, having at least a first and a second tube that telescope and are joined by a spreading element, of the type used in hiking poles or ski poles.

In an adjustable-length stick such as is known from DE 297 06 849 U1, the spreading element is provided with a tapering inner cone with an apex oriented towards an inner tube, whereas the corresponding interior element that is provided with the outer cone is displaced towards the inner tube by an adjusting screw so that the spreading device can grab hold. In this manner, although the result is a relatively parallel clamping over the entire axial length of the spreading element, nevertheless it has been found that in response to impact-like stresses on the stick tip from the handle-side of the adjustable-length stick, an axial displacement of the outer tube with respect to the inner tube cannot always be avoided and especially not when, in a twisting motion used to expand the spreading element, insufficient force has been applied for purposes of clamping.

Furthermore, from DE 297 08 829 U1, an adjustable-length stick is known, in which an interior element that is provided with an outer cone is formed by a forward free end of an adjusting screw, and a spreading element that is provided with an inner cone is moved axially on the adjusting screw. In this context, although the inner cone of the spreading element is opened towards the inner tube, nevertheless the same aforementioned disadvantages arise here if the spreading element is axially fixed in the spread-apart state. In this case as well, a relative motion between the outer tube and the spreading element can occur.

The objective of the present invention is to create an adjustable-length stick, especially for poles, of the species cited above, which, in response to impact-like axial stresses, continues to clamp rather than slide or give way.

SUMMARY OF THE INVENTION

The features of the present invention combine to achieve this objective in an adjustable-length pole, especially for one having telescoping tubes, of the aforementioned kind.

As a result of the features according to the present invention, it is achieved that in response to an aforementioned impact-like stress, the holding force between the spreading element, or inner tube, and the outer tube is increased, because as a result of the relative axial movability of the interior element and the spreading element, the interior element is able to penetrate further into the inner cone of the spreading element. Even in the case of a telescope mechanism where a spreading element is tightened using too little torque, the result is essentially a further spreading, which in turn reinforces the clamping force in the direction of the stress, so that even in these cases a displacement or a relative motion is prevented.

In a preferred embodiment of the invention, the spreading element is configured in a pot-like fashion, with a pot base being penetrated by a free end area of said adjusting screw, facing away from said inner tube.

In another preferred embodiment, the spreading element comprises a cylindrical shoulder having a smaller exterior diameter and facing said inner tube, with the shoulder being axially guided at one area of said end of said inner tube.

In both these embodiments, a jam-free guiding of the spreading element within the given axial movability is provided.

In an advantageous embodiment with regard to an outer limit stop for the spreading element, the outer limit stop is formed by a cap that is axially secured at the free end of the adjusting screw after the spreading element has been set in place. The assembly of the spreading element thereby takes place before attachment of the outer limit stop.

In an alternative embodiment of the invention, the exterior limit stop is formed by a head that is moulded onto the free end of the adjusting screw, and the spreading element has a peripheral slot that extends along an entire axial length thereof. With the stop already provided, the spreading element is configured such that it can be radially placed onto the adjusting screw and the interior element.

In one advantageous embodiment of the inner limit stop, the spreading device has a plug that accommodates the adjusting screw in an axial and rotationally fixed manner, the plug being supported axially and in a rotationally fixed manner in the inner tube and defining the inner limit stop. The plug has an axially protruding guide member cooperating with the cylindrical shoulder of the spreading element.

In another exemplary embodiment of the invention, the interior element has one or more radially protruding fins, which are guided in axial slots of the spreading element. A rotationally fixed axial movability of the interior element with respect to the spreading element is thereby achieved.

In a further exemplary embodiment of the invention, the adjustable-length pole comprises: at least one outer tube; an inner tube structured and dimensioned for insertion into the outer tube in a telescoping fashion for adjusting a length of the pole; a first limit stop disposed at an end of the inner tube; an adjusting screw being axially oriented within the outer tube, non-rotatable with respect to the inner tube and supported in a fixed manner on the end of the inner tube; a second limit stop disposed on a free end of the adjusting screw; a radially spreadable element with a non-threaded bore and with only one single inner cone, the inner cone opening towards the end of the inner tube, wherein the radially spreadable element is disposed with its axial length between the first limit stop disposed at the end of the inner tube and the second limit stop disposed on the free end of the adjusting screw, and wherein the distance between the first and second limit stops is larger than the axial length of the radially spreadable element by a gap distance, such that the radially spreadable element is moveable axially within the distance between the first and second limit stops, including the gap distance, without rotation thereof and is contactable with each limit stop; and an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable with respect to the inner tube by rotation thereof via the internal threaded bore. The radially spreadable element and the interior element cooperate to form a spreading device supported axially at the end of the inner tube, the spreading device for clamping the inner tube within the outer tube, and the adjusting screw is fixed within the outer tube by a plug with a collar facing the spreadable element and the interior element. According to this exemplary embodiment, the interior element comprises a surface facing said collar, which is provided with at least one axial protrusion extending towards said collar. To have such an axial protrusion, i.e. a protrusion protruding from the surface of the interior element facing said collar in axial direction towards an end of the inner tube, prevents that there is a full surface contact between the surface of the interior element facing said collar and the surface of said collar. If such a full surface contact is possible, it may happen that upon complete rotation of the interior element into the position where it is touching the collar it may become friction locked against the collar. This can be prevented by providing such an axial protrusion.

In the alternative it is possible that the surface of the collar facing the interior element is provided with at least one axial protrusion extending towards said surface of the interior element, having essentially the same effect, namely that there is no full surface contact in the lowermost position of the interior element but only a small contact area or contact point to avoid friction locking.

According to yet another exemplary embodiment, both the interior element as well as the surface of the collar facing the interior element are provided with such protrusions of opposite orientation.

Also within this embodiment, the radially spreadable element may have a peripheral slot that extends along an entire axial length of the radially spreadable element.

According to yet a further exemplary embodiment, the axial protrusion on the surface of the interior element and/or the axial protrusion on the collar of the plug are wedge shaped. This means that a protrusion on the interior element has a sloped or inclined surface facing (with the inclination angle) the surface of the collar, and it has an axial surface oriented essentially perpendicular to the surface of the collar and to the bottom surface of the interior element. On the other hand this means that the protrusion on the collar has a sloped or inclined surface facing (with the inclination angle) the bottom surface of the interior element and it also has an axial surface oriented perpendicular to the surface of the collar and to the bottom surface of the interior element. The inclination of the sloped surfaces, in both cases, i.e. on the collar as well as on the interior element, preferably has the same inclination as the inclination of the threading of the adjustment screw.

According to an even further exemplary embodiment, both the surface of the interior element and the collar of the plug are provided with at least one wedge shaped axial protrusion each, wherein the wedge shaped axial protrusion on the surface of the interior element has a first sloped surface and a first axial surface and the wedge shaped axial protrusion on the surface of the collar of the plug has a second sloped surface and a second axial surface, and wherein the first axial surface and the second axial surface face each other and are contactable (by abutment) by rotation of the interior element via the internal threaded bore. It is, for example, possible to have one such wedge shaped protrusion on the interior element and to have such wedge shaped protrusions on the collar, the latter to being arranged opposite each other.

It is generally possible that these protrusions or wedges are one-piece with the interior element and the plug forming the collar, respectively.

BRIEF DESCRIPTION OF THE DRAWINGS

Further details of the present invention can be derived from the following description, in which the present invention is described in greater detail and is explained on the basis of the exemplary embodiments depicted in the drawing. In the latter:

FIG. 1 in a partial longitudinal cutaway and truncated view depicts an adjustable-length pole according to a first exemplary embodiment of the present invention, FIG. 2 depicts a partial longitudinal cutaway view, rotated 90° with respect to FIG. 1, of the first exemplary embodiment, FIG. 4 depicts a representation corresponding to FIG. 1, but in accordance with a second exemplary embodiment of the present invention, and FIG. 5 depicts a representation corresponding to FIG. 2, but in accordance with the second exemplary embodiment of the present invention and FIGS. 6 a)-f) depict a third exemplary embodiment with the outer tube removed for better visibility, wherein in FIGS. 6a)-6d) provide views from the four different lateral directions are illustrated, in FIG. 6e) a top view is illustrated and in FIG. 6f) a perspective view is illustrated of the spreading device with all parts mounted thereon;

FIGS. 10b)-g) depict the interior element of the third exemplary embodiment in the four lateral side views in FIGS. 10b)-10e), in an axial cut along the line A-B in FIG. 10a), in a perspective view in FIG. 10f) and in a bottom view in FIG. 10g); and FIG. 11 shows the situation of contact of the axial surfaces of the wedge shaped protrusions in a perspective view.

DESCRIPTION OF THE PREFERRED EMBODIMENT

Figure 3:
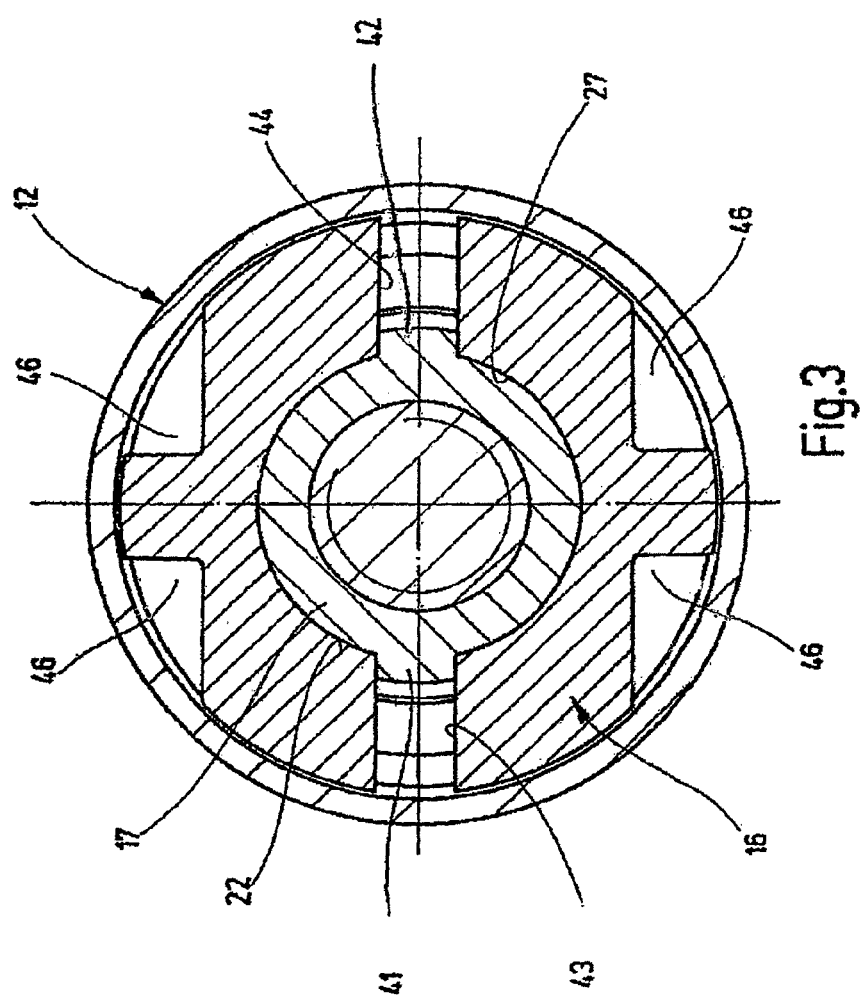
FIG. 3 depicts a view along the line III-III of FIG. 2.

In the connecting segments of an adjustable-length pole 10, 110, depicted in the drawing in accordance with two exemplary embodiments, an inner tube 11 is guided telescope-like in an outer tube 12. For this purpose, inner tube 11, at its end 13 that is facing outer tube 12, is provided with a spreading device 15, 115, using which inner tube 11 can be fixed at any position within the outer tube 12 in a clamping manner.

Spreading device 15, 115 has an exterior element in the form of a spreading element 16, 116, an interior element 17, and an adjusting screw, or externally threaded rod 18, 118. Externally threaded rod 18, 118, which is arranged in the axial direction of pole 10, 110, is supported at its one end area in a rotationally fixed manner on insertion end 13 of inner tube 11. For this purpose, externally threaded rod 18, 118 is inserted, or screwed, into an end plug 19, or is integrally configured on the latter, or the like, and is axially fixed and held in a rotationally fixed manner in the end plug using adhesive or the like. End plug 19 is also axially fixed and supported in a rotationally fixed manner in inner tube 11.

Interior element 17 by its axial central interior thread 21 is screwed onto externally threaded rod 18, 118. Interior element 17 is provided on its exterior side with a cone 22, or it is configured in a conical manner. Outer cone 22 tapers toward the free end of externally threaded rod 18, 118. Externally threaded rod 18, 118 penetrates internally threaded bore 21 of interior element 17 and is connected at its protruding free end in a rotationally fixed manner to an exterior limit stop 26, 126.

Exterior-side spreading element 16, 116 on its spreadable main body 23, 123 has an inner cone, or interior taper 27, 127 whose slope corresponds to that of outer cone, or exterior taper 22 of interior element 17. According to the graphic depiction, interior element 17 is accommodated without play in spreading element 16, 116, which is oriented in the contrary direction, outer cone 22 being shorter than inner cone 27, 127. In accordance with the depicted arrangement, inner cone, or interior taper 27, 127 of spreading element 16, 116 opens towards the end of inner tube 11, 111 from an apex 27A. By way of example, spreading element 16, 116 can be made of plastic, and interior element 17, 117 can be made of metal or plastic.

Integral end plug 19 is provided with an interior part 31, which is supported in inner tube 11 so as to be prevented from rotating or sliding, and a collar 32, which lies on the annular end face of inner tube 11. Protruding from collar 32 is a guide piece 33 for spreading element 16, 116, the guide piece having a smaller diameter than the latter.

Spreading element 16, 116 is roughly pot shaped, pot base 36, 136 having a through bore 37, 137, which is penetrated by the free end area of adjusting screw 18, 118. Pot base 36, 136 is axially movable relative to adjusting screw 18, 118. Main body 23, 123 of spreading element 16, 116, which on the exterior periphery can be provided with one or more friction linings, can be coated therewith, or can be configured through its surface composition (for example, longitudinal ribs) so as to achieve an increased frictional force with respect to the interior periphery of outer tube 12, has, on its end facing away from pot base 36 and facing inner tube 11, a cylindrical shoulder 38, 138, that is smaller in its exterior diameter, in which guide piece 33 can engage at its end side. In this context, between guide piece 33 and spreading element 16, 116, enough play is available, so that the latter can move unhindered both axially and radially. Therefore, spreading element 16, 116 is axially movable within narrow limits between a first, outer limit stop 26, 126 on the free end of adjusting screw 18, 118 and a second, inner limit stop 28, which is formed by the annular surface of collar 32 around guide piece 33. The distance between the surfaces of the first limit stop 24, 124 and the second limit stop 28 is somewhat greater than the axial length of spreading element 16, 116 between the exterior surface of pot base 36 and the annular end face of cylindrical shoulder 38, 138.

In the exemplary embodiment of FIGS. 1 through 3, first or outer limit stop 26 is formed by a cap 26', which is attached to the free end of adjusting screw 18, for example, by being screwed, pressed, glued, plastic-extruded, or attached in some other way. Cap 26' has a radial edge 24 acting as a limit stop surface 24, which can come into contact with spreading element 16.

In the exemplary embodiment of FIGS. 4 and 5, outer limit stop 126 is configured as a head 126' that is formed on the free end of adjusting screw 118, interior annular surface 124 of the head constituting the limit stop surface for spreading element 116.

Interior element 17 on each of two diametrically opposite peripheral areas of outer cone 22 has a plurality of fins 41, whose longitudinal end face runs parallel to the stick axis. Each fin 41 is axially guided in a correspondingly wide slot 43, 44, and 143, 144 of spreading element 16, 116. In this manner, when interior element 17 moves axially relative to spreading element 16, 116, it cannot rotate with respect to the latter. Both slots 43, 44, and 143, 144 are provided essentially over the longitudinal extension of main body 23, 123 of spreading element 16, 116, i.e., they only penetrate into the area of cylindrical shoulder 38, 138 to an insignificant extent. In other words, this also means that the greatest radial dimension of diametrically opposite fins 41, is equal to the interior diameter of cylindrical shoulder 38, 138.

As can be seen from FIG. 3, which essentially applies to both the first and second exemplary embodiments, spreading element 16, 116 is furnished on its exterior periphery with four notches 46, 146 that are all axially and centrally symmetrical to each other, which run in the longitudinal direction and extend over virtually the entire length of main body 23, 123 of spreading element 16, 116.

Generated in this manner are defined, peripheral clamping areas of spreading element 16, 116. In the first exemplary embodiment of FIGS. 1 through 3, after spreading device 16 is fixed in inner tube 11, interior element 17 is screwed onto the free end of adjusting screw 18, and thereafter spreading element 16 is placed over adjusting screw 18. Subsequently, exterior limit stop 26 is attached at the protruding end of adjusting screw 18, after which the end of inner tube 11, which has been completed in this manner, can be inserted into outer tube 12.

In the second exemplary embodiment of FIGS. 4 and 5, in which adjusting screw 118 has molded head 126' and in which interior element 17 is screwed from the other side of adjusting screw 118, before adjusting screw 118 has been fixedly joined to end plug 19, spreading element 116 (if it has not been threaded first) must subsequently be placed over adjusting screw 118 and interior element 17. For this purpose, spreading element 116 according to FIG. 5 has an axially continuous slot 148, at which spreading element 116 can be opened radially and placed over interior element 17 and adjusting screw 118. In the depicted second exemplary embodiment, continuous slot 148 is partially identical with one of slots 143, 144, although it is narrower in the area that extends further.

In response to the motion of clamping inner tube 11 in outer tube 12 using spreading device 15, 115, interior element 17 is moved away from inner tube 11 in the direction of arrow A by rotating inner tube 11 and therefore adjusting screw 18, 118 to the right (in the case of a left-handed thread) or to the left (in the case of a right-handed thread) with respect to outer tube 12, spreading element 16, 116 first being moved, or pushed, in the same direction up to exterior limit stop 26,126. Thereafter, in response to a further axial motion of interior element 17, spreading element 16, 116 is spread apart radially in the direction of arrow A, so that the exterior circumference of spreading element 16, 116 under pressure contacts the interior circumference of outer tube 12. In this state, the annular end face of cylindrical shoulder 38, 138 of spreading element 16, 116 has a specific, preestablished, slight distance a from inner limit stop surface 28 of collar 32. Then, inner tube 11 being clamped in outer tube 12 using a more or less high torque, if an impact-like axial stress is exerted from outer tube 12, which is provided, for example, with a handle, onto inner tube 11, which is provided with a stick tip, then due to the clamping fixation of spreading element 16, 116 in outer tube 12, interior element 17 can move axially. This means that interior element 17 moves further into interior cone 27, 127 of spreading element 16, 116, which leads to a further spreading of spreading element 16, 116 and therefore to an increase in the holding force between interior tube 11 and outer tube 12.

Figure 6:
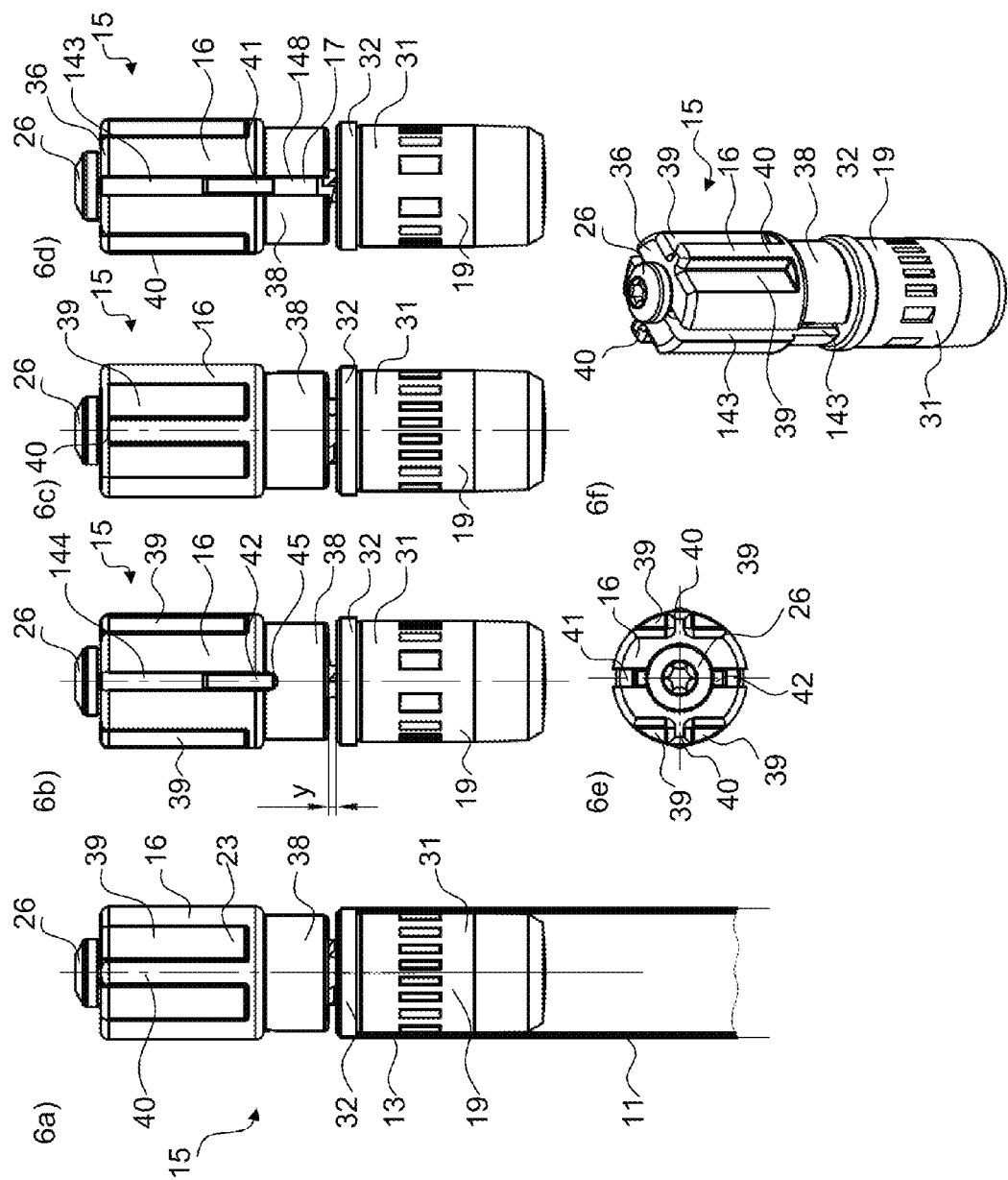
Figure 7:
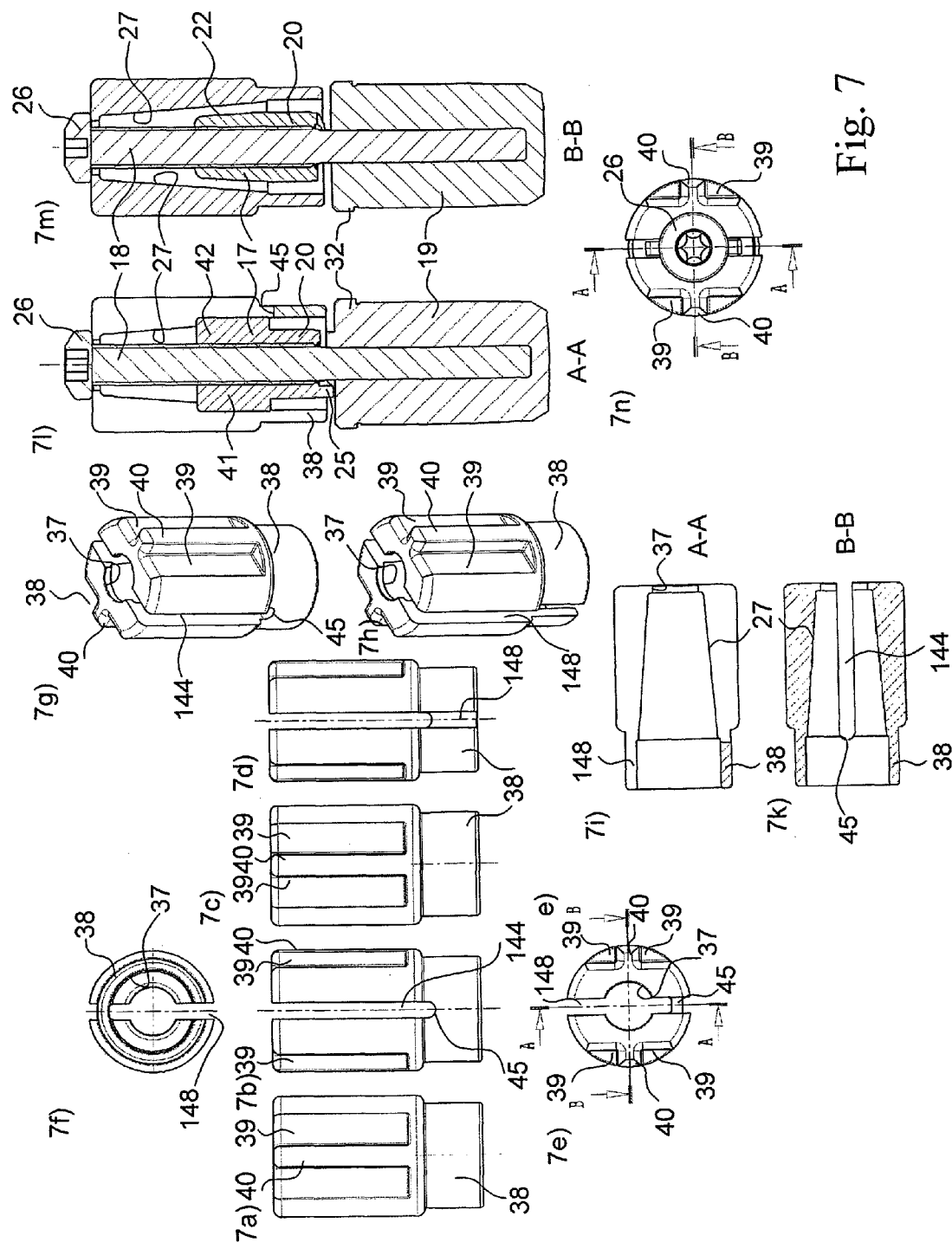
FIGS. 7a)-m) depict the spreadable element according to the third exemplary embodiment, wherein in FIGS. 7a)-7d) views from the four different lateral directions are illustrated, in FIGS. 7e) and 7f) a top and bottom view are illustrated, respectively, in FIGS. 7g) and 7h) to different perspective illustrations are given, in FIGS. 7i) and 7k) the cuts along A-A and B-B as given in FIG. 7e) are illustrated, and in FIGS. 7l) and 7m) the cuts along A-A and B-B as defined in FIG. 7n), a top view, are given for the assembled third exemplary embodiment.
Figure 8:
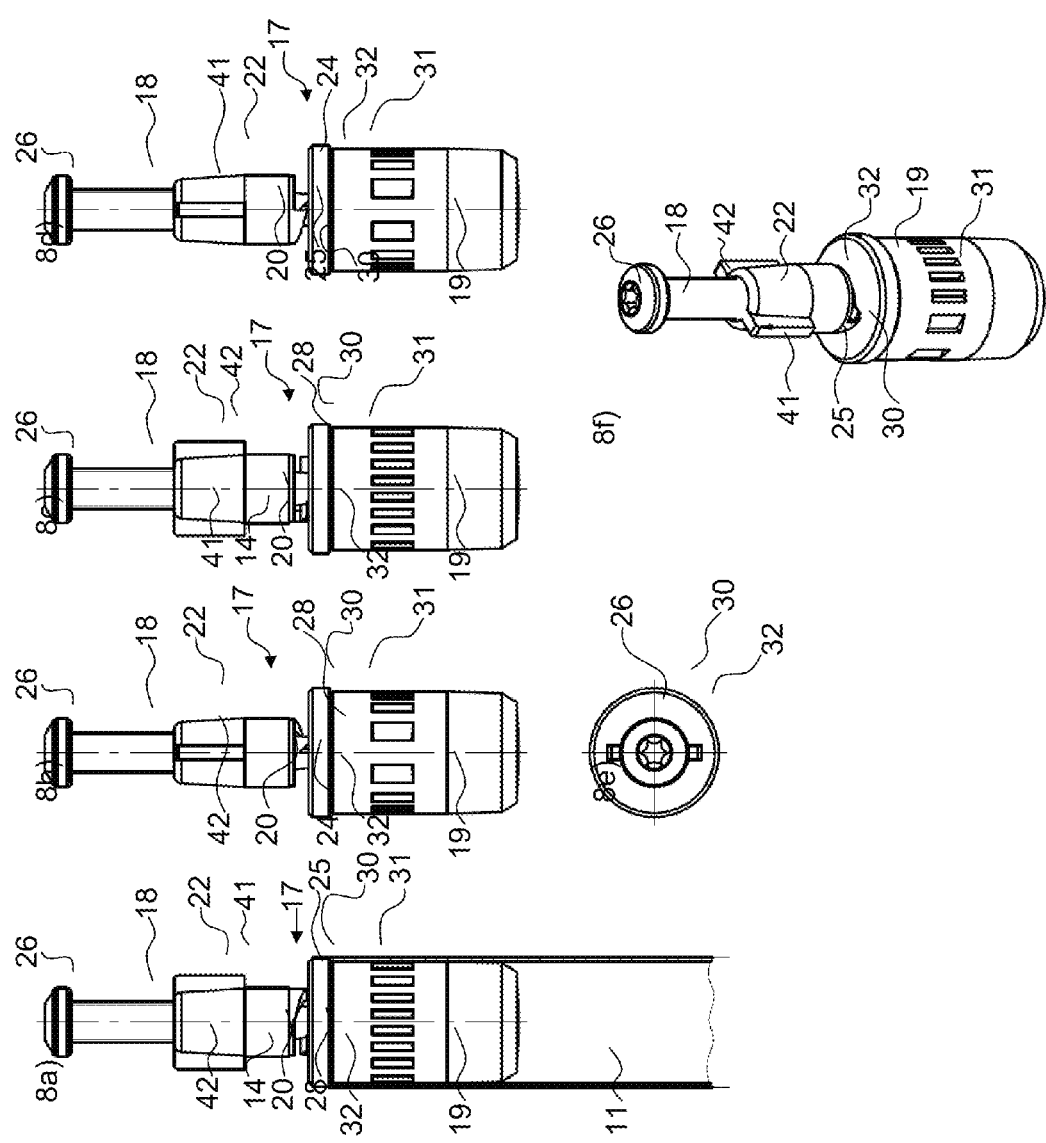
FIGS. 8a)-f) depict the third exemplary embodiment with the spreadable element removed, wherein in FIGS. 8a)-8d) views from the four different lateral directions are illustrated, in FIG. 8e) a top view is illustrated and in FIG. 8f) a perspective view is illustrated.
Figure 9:
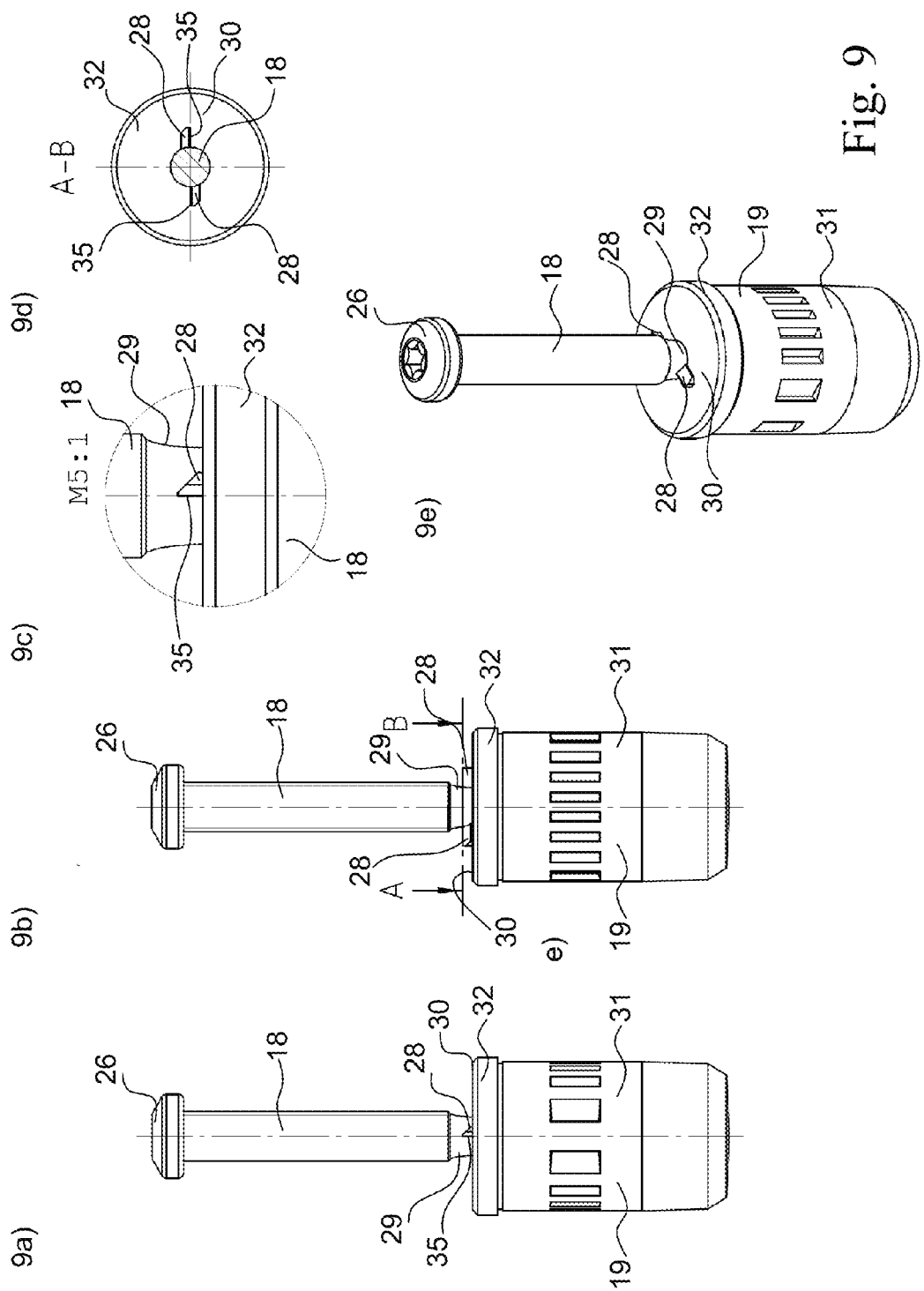
FIGS. 9a)-d) depict the third exemplary embodiment with the spreadable element and the interior element removed, wherein in FIGS. 9a) and b) lateral views rotating by 90° are indicated, FIG. 9c) is a detailed view on the bottom part of the adjusting screw in a magnified representation, FIG. 9d) is a top view and FIG. 9e) is a perspective view.

FIGS. 6-11 show a third exemplary embodiment of the present invention, wherein in FIG. 6 this spreading device 15 is shown in an assembled state but with the outer tube removed for better visibility, in FIG. 7 the spreading element 16 is shown in different views and also some axial cuts of the assembled device, in FIG. 8 the spreading device 15 is shown with the spreading element 16 removed to show the interior element 17 as mounted on the adjusting screw 18 in more detail, FIG. 9 shows the spreading device 15 with spreading element 16 and interior element 17 removed, FIG. 10 shows the interior element 17 in different views and FIG. 11 shows in a perspective view how the protrusions 25 on the interior element and 28 on the collar 32 of the plug 19 contact each other.

As one can see from FIG. 6 and FIG. 7, the spreading element 16 in an axial direction again comprises, at its end facing the interior tube 11, a cylindrical shoulder 38, wherein the outer diameter is significantly smaller than the inner diameter of the outer tube, so cylindrical shoulder 38 is not contacting the inner surface of the outer tube 12 if clamping it. Above cylindrical shoulder 38 there is the spreadable main body 23 of the spreading element. This main body 23 is provided with axial recesses 39 which give rise to protrusions 40. As a result, the outer cylindrical surface of this spreadable main body 23 does not contact the interior surface of the outer tube in a full surface contact but only in those surface areas which are not recessed by the four axial recesses 39, as seen also in FIG. 7.

As in the case of the second exemplary embodiment, the spreadable element 16 comprises two slots 143 and 144 for engagement of the fins 41, 42, respectively, of the interior element 17. One of these slots 144 is axially discontinuous, i.e. at the position of this slot 144 the main part of the cylindrical shoulder 38 is not interrupted by the slot. The slot 144 has a bottom 45 which is sufficiently low such that if, as illustrated in FIG. 6b), the interior element 17 is in its lowermost position and in contact with the plug 19 or the wedge 28, the bottom end of the corresponding fin 42 of the interior element 17 may just about or not even contact this bottom 45 in a position where still the spreading element 16 contacts the upper limit stop 26 and where there is a gap distance illustrated with y. The parameter y is normally in the range of 0.1-1.5 mm.

Opposite said discontinuous slot 144 there is provided in the spreadable element 16 an axially continuous slot 148, which extends through the full axial length of the spreadable element 16.

The pot base of the spreadable element 16 is provided with a through bore with an inner diameter larger than the outer diameter of the screw 18 and not provided with a threading, so the spreadable element 16 can move along the screw 18 without rotation of the spreadable element 16.

To have one discontinuous slot 144 at one side and one continuous slot 148 at the opposite side in the spreadable element 16 has the advantage that, for assembly of such a spreading device 15, the spreading element 16, which usually is made of a polymer material, can be forced apart along the axially continuous slot 148 such that the two halves joined by the cylindrical shoulder part 38 below the above-mentioned bottom 45, can be opened and the whole spreading element 16 can be shifted from a lateral direction onto the spreading device, more specifically onto the interior element 17 mounted on the screw 18, as illustrated in FIG. 8.

As can be seen in particular from FIGS. 8 and 10, the interior element 17 in this case is provided with fins 41, 42 extending much further in a radial direction than in the previous exemplary embodiments. In this case also, at their bottom end, the fins extend by a radial width 14 in a radial direction beyond the surface of the cylindrical part of the interior element. The radial width 14 is typically in the range of 0.5-2.0 mm.

The interior element 17 correspondingly comprises a cylindrical part 20, which is essentially located in a cylindrical recess in the region of the cylindrical shoulder 38 of the spreading element 16, and a conically converging part which forms the cone 22 of the interior element 17. Typically the inclination angle of this cone 22 with respect to the axial direction is small, i.e. below 10° typically it is in the range between 3-5°. The inclination angle of the corresponding interior surface 27 of the spreadable element 16 is essentially complementary thereto. The fins 41, 42 are only provided in the region of the cone 22. They extend over the full length of the cone 22. The fins 41, 42, of which two are located opposite each other, typically have a thickness 14a in the range of 0.5-1.5 mm.

At the bottom end of the interior element 17 there is an essentially flat bottom surface 24 facing the collar 32 of the plug 19. According to this embodiment, on this surface 24 there is provided a wedge shaped protrusion 25, which extends in an axial direction towards the collar 32. It has an inclined or sloped surface facing the plug, which smoothly passes into the bottom surface 24, and it has an axial abutment surface 34. The two surfaces converge at a ridge of the ramp 25. Typically the wedge shaped element 25 extends over 90 degrees of the circumference of this bottom surface 24. The inclination of the sloped surface of the ramp 25 is essentially along the same direction as the threading of the adjusting screw 18. It may, however, have a different size of the pitch.

As can be seen from FIGS. 7l) and 7m), the surfaces 22 and 27 are essentially parallel, and if the interior element 17 is in the bottommost position, the fin 42 located in slot 144 does not even reach bottom 45, even if the spreadable element 16 is in contact with exterior limit stop 26. As the inner tube and, correspondingly, the plug 19 is rotated, interior element 17 travels upwards without rotation thereof (also the spreadable element 16 is not rotating, the two being interlocked by fins and slots, as concerns rotation) until surface 22 contacts surface 27. If then rotation continues, interior element 17 is forced into spreadable element 16 pushing the spreadable main body 23 apart in axial direction, thus clamping the outer tube.

On the upper surface 30 of the collar 32 of the end plug 19, at the same radial distance from the center axis of the adjusting screw there is provided two protrusions 28 on the collar 32. These protrusions 28 are also wedge shaped ramps 28 with an inclined surface with the same direction of inclination as the inclined surface of the ramp 25 (however with a different size of each possibly), and with, as best visible in FIG. 9, an axial abutment surface 35. This abutment surface 35 is facing the abutment surface 34 on the interior element 17 such that, as illustrated in FIG. 11, if the interior element 17 is rotated on the adjusting screw 18 by rotation of the interior element with respect to the adjusting screw to its bottommost position, the two surfaces 34 and 35 will abut on each other and correspondingly full surface contact of surfaces 24 and 30 is avoided and correspondingly also frictional locking between the interior element 17 and collar 32 is not possible.

LIST OF REFERENCE NUMERALS

- 10, 110 adjustable-length pole
- 11, 111 inner tube
- 12, 112 outer tube
- 13, 113 end of inner tube facing outer tube
- 14 radial width of fin at lower end
- 14a thickness of fin
- 15, 115 spreading device
- 16, 116 spreading element
- 17, 117 interior element
- 18, 118 externally threaded rod, adjusting screw
- 19, 119 end plug
- 20 cylindrical part of interior element
- 21, 121 axial central interior thread of interior element
- 22, 122 cone of interior element
- 23, 123 spreadable main body of spreading element
- 24 bottom surface of interior element
- 25 ramp on bottom surface of interior element, wedge
- 26, 126 exterior limit stop
- 27, 127 inner cone, interior taper
- 28 ramp on collar of end plug
- 29 tapered portion of adjusting screw
- 30 upper surface of collar
- 31, 131 interior part of end plug
- 32, 132 collar of end plug
- 33, 133 guide piece of end plug
- 34 axial abutment surface of ramp on interior element
- 35 axial abutment surface of ramp on collar
- 36, 136 pot base of spreading element
- 37, 137 through bore through pot base
- 38, 138 cylindrical shoulder of spreading element
- 39 axial recess in spreading element
- 40 axial protrusion of spreading element
- 41, 141 fin
- 42, 142 fin
- 43, 143 slot
- 44, 144 slot
- 45 bottom of axially discontinuous slot
- 148 axially continuous slot
- y gap distance for the situation when the spreadable element is in contact with upper limit stop

What is claimed:

1. An adjustable-length pole, the pole comprising:
an outer tube;
an inner tube structured and dimensioned for insertion into the outer tube in a telescoping fashion for adjusting a length of the pole;
a first limit stop disposed at an end of the inner tube;
an adjusting screw being axially oriented within the outer tube, non-rotatable with respect to the inner tube and supported in a fixed manner on the end of the inner tube;
a second limit stop disposed on a free end of the adjusting screw;
a radially spreadable element having an axial length and comprising a non-threaded bore and only one single inner cone, the inner cone opening towards the end of the inner tube, wherein the radially spreadable element is disposed with its axial length between the first limit stop disposed at the end of the inner tube and the second limit stop disposed on the free end of the adjusting screw, and wherein the distance between the first and second limit stops is larger than the axial length of the radially spreadable element by a gap distance; and
an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable within the spreadable element with respect to the inner tube by rotation thereof via the internal threaded bore, the radially spreadable element being moveable axially within the distance between the first and second limit stops, including the gap distance, without relative rotation between the spreadable element and the interior element and being contactable with each limit stop,
wherein the radially spreadable element and the interior element cooperate to form a spreading device supported axially at the end of the inner tube, the spreading device for clamping the inner tube within the outer tube by radial outer surface portions of the radially spreadable element frictionally engaging with the interior wall of the outer tube,
wherein the adjusting screw is fixed within the inner tube by a plug with a collar facing the spreadable element and the interior element, and
wherein the interior element comprises a surface facing said collar, which is provided with at least one axial protrusion extending towards said collar and which is contactable with a surface of said collar.

2. An adjustable-length pole, the pole comprising:
an outer tube;
an inner tube structured and dimensioned for insertion into the outer tube in a telescoping fashion for adjusting a length of the pole;
a first limit stop disposed at an end of the inner tube;
an adjusting screw being axially oriented within the outer tube, non-rotatable with respect to the inner tube and supported in a fixed manner on the end of the inner tube;
a second limit stop disposed on a free end of the adjusting screw;
a radially spreadable element having an axial length and comprising a non-threaded bore and only one single inner cone, the inner cone opening towards the end of the inner tube, wherein the radially spreadable element is disposed with its axial length between the first limit stop disposed at the end of the inner tube and the second limit stop disposed on the free end of the adjusting screw, and wherein the distance between the first and second limit stops is larger than the axial length of the radially spreadable element by a gap distance; and
an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable within the spreadable element with respect to the inner tube by rotation thereof via the internal threaded bore, the radially spreadable element being moveable axially within the distance between the first and second limit stops, including the gap distance, without relative rotation between the spreadable element and the interior element and being contactable with each limit stop,
wherein the radially spreadable element and the interior element cooperate to form a spreading device supported axially at the end of the inner tube, the spreading device for clamping the inner tube within the outer tube, by radial outer surface portions of the radially spreadable element frictionally engaging with the interior wall of the outer tube;

wherein the adjusting screw is fixed within the inner tube by a plug with a collar facing the spreadable element and the interior element, and wherein a surface of the collar faces a surface of the interior element and is provided with at least one axial protrusion extending towards said surface of the interior element and which is contactable with a surface of the interior element.

3. The adjustable-length pole of either claim 1 or claim 2, wherein the limit stop disposed on the free end of the adjusting screw is formed by a head that is moulded onto the free end of the adjusting screw.

4. The adjustable-length pole of either claim 1 or claim 2, wherein the limit stop disposed on the free end of the adjusting screw is a cap that is axially secured at the free end of the adjusting screw after the radially spreadable element has been set in place.

5. The adjustable-length pole of claim 1, wherein said radially spreadable element has a plurality of axial slots and said interior element has a plurality of radially protruding fins, each of said fins being guided in a respective axial slot of the radially spreadable element for axial movement of said fins within said slots, and wherein said axial slots have an axial length which is larger than the axial length of said fins and respective pairs of said axial slots and said radially protruding fins structurally cooperate to permit said interior element to move axially as the internal threaded bore is rotated with respect to said adjusting screw without rotation of said radially spreadable element.

6. The adjustable-length pole as recited in claim 5, wherein said axial slots extend over most but not all of an entire axial length of said radially spreadable element.

7. The adjustable-length pole as recited in claim 5, wherein said axial slots extend to but not entirely through a shoulder portion of said radially spreadable element that is proximate the first limit stop.

8. The adjustable-length pole as recited in either claim 1 or claim 2, wherein the radially spreadable element has a peripheral slot that extends along its entire axial length.

9. The adjustable-length pole as recited in claim 1, wherein the collar of the plug is provided with at least one axial protrusion, and wherein at least one of an axial protrusion on at least one of the surface of the interior element and an axial protrusion on the collar of the plug is wedge shaped.

10. The adjustable-length pole as recited in claim 9, wherein both the surface of the interior element and the collar of the plug are provided with at least one wedge shaped axial protrusion each, wherein the wedge shaped axial protrusion on the surface of the interior element has a first sloped surface and a first axial surface and the wedge shaped axial protrusion on the surface of the collar of the plug has a second sloped surface and a second axial surface, and wherein the first axial surface and the second axial surface face each other and are contactable by rotation of the interior element via the internal threaded bore.

11. The adjustable-length pole of either claim 1 or claim 1, wherein the pole is a ski or a walking stick.

12. The adjustable-length pole of claim 2, wherein said radially spreadable element has a plurality of axial slots and said interior element has a plurality of radially protruding fins, each of said fins being guided in a respective axial slot of the radially spreadable element for axial movement of said fins within said slots, and wherein said axial slots have an axial length which is larger than the axial length of said fins and respective pairs of said axial slots and said radially protruding fins structurally cooperate to permit said interior element to move axially as the threaded element is rotated with respect to said interior element without rotation of said radially spreadable element.

13. The adjustable-length pole as recited in claim 12, wherein said axial slots extend over most but not all of an entire axial length of said radially spreadable element.

14. The adjustable-length pole as recited in claim 12, wherein said axial slots extend to but not entirely through a shoulder portion of said radially spreadable element that is proximate said inner limit stop.

15. An adjustable-length pole, the pole comprising:
an outer tube;
an inner tube structured and dimensioned for insertion into the outer tube in a telescoping fashion for adjusting a length of the pole;
a first limit stop disposed at an end of the inner tube;
an adjusting screw being axially oriented within the outer tube, non-rotatable with respect to the inner tube and supported in a fixed manner on the end of the inner tube;
a second limit stop disposed on a free end of the adjusting screw;
a radially spreadable element having an axial length and comprising a non-threaded bore and only one single inner cone, the inner cone opening towards the end of the inner tube, wherein the radially spreadable element is disposed with its axial length between the first limit stop disposed at the end of the inner tube and the second limit stop disposed on the free end of the adjusting screw, and wherein the distance between the first and second limit stops is larger than the axial length of the radially spreadable element by a gap distance; and
an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable within the spreadable element with respect to the inner tube by rotation thereof via the internal threaded bore, the radially spreadable element being moveable axially within the distance between the first and second limit stops, including the gap distance, without relative rotation between the spreadable element and the interior element and being contactable with each limit stop,
wherein the radially spreadable element and the interior element cooperate to form a spreading device supported axially at the end of the inner tube, the spreading device for clamping the inner tube within the outer tube, by radial outer surface portions of the radially spreadable element frictionally engaging with the interior wall of the outer tube;
wherein the adjusting screw is fixed within the inner tube by a plug with a collar facing the spreadable element and the interior element,
wherein the interior element comprises a surface facing a surface of said collar, said surface of the interior element being provided with at least one axial protrusion extending towards said collar, and
wherein the surface of the collar facing the interior element is provided with at least one axial protrusion extending towards said surface of the interior element and which is contactable with the axial protrusion of the interior element.

* * * * *